US006313854B1

(12) United States Patent
Gibson (10) Patent No.: US 6,313,854 B1
(45) Date of Patent: Nov. 6, 2001

(54) DISPLAY MECHANISM FOR HTML FRAMES

(75) Inventor: Kevin Patrick Gibson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/174,181

(22) Filed: Oct. 16, 1998

(51) Int. Cl.$^7$ .................................................... G06F 3/14
(52) U.S. Cl. ........................ 345/788; 345/803; 345/746
(58) Field of Search ................................. 345/326, 333, 345/334, 339, 340, 342, 343

(56) References Cited

U.S. PATENT DOCUMENTS

| | | | |
|---|---|---|---|
| 5,544,300 | * 8/1996 | Skarbo et al. | 345/332 |
| 5,659,694 | * 8/1997 | Bibayan | 345/340 |
| 5,701,451 | 12/1997 | Rogers et al. | 707/1 |
| 5,710,918 | 1/1998 | Lagarde et al. | 707/10 |
| 5,712,995 | * 1/1998 | Cohn | 345/342 |
| 5,721,908 | 2/1998 | Lagarde et al. | 707/10 |
| 5,734,380 | * 3/1998 | Adams et al. | 345/340 |
| 5,819,055 | * 10/1998 | MacLean et al. | 345/342 |
| 5,847,706 | * 12/1998 | Kingsley | 345/342 |
| 5,917,483 | * 6/1999 | Duncan et al. | 345/333 |
| 5,929,854 | * 7/1999 | Ross | 345/342 |
| 5,973,696 | * 10/1999 | Agranat et al. | 345/357 |
| 6,008,809 | * 12/1999 | Brooks | 345/342 |
| 6,021,418 | * 2/2000 | Brandt et al. | 707/516 |

FOREIGN PATENT DOCUMENTS

| | | |
|---|---|---|
| 2312973 | 11/1997 | (GB) . |
| WO9742584 | 11/1997 | (WO) . |
| WO9801825 | 1/1998 | (WO) . |

OTHER PUBLICATIONS

SPIE vol. 2670, "Storage and Retrieval for Still Image and Video Databases IV," pp. 253–264, 1996.
Dr. Dobb's Journal, May 1996, vol. 21, Issue 5, pp. 72–87, "Sharing Data Between Web Page Frames Using JavaScript," Tom Tessier.
Computer Networks and ISDN Systems, vol. 29, No. 8–13, Sep. 1997, Papers from the Sixth International World Wide Web Conference, pp. 1507–1517.
Dr. Dobb's Journal, Oct. 1997, vol. 22, Issue 10, pp. 46–53 "Java and Inter–Applet Communication," Andrew Meckler.
IBM Technical Disclosure Bulletin, vol. 40, No. 11, Nov. 1997, "Focus Highlight for World Wide Web Frames", p. 89.
IBM Technical Disclosure Bulletin, vol. 40, No. 11, Nov. 1997, "Displaying Web Pages in Frames", p. 95.
Computer–innovative technology for computer professionals, Dec. 1997, vol. 30, No. 12, "Is it Too Later to Put the User Back into HTML?" Ken Magel, pp. 131–132.
More About Web Turbo, http://www.webturbo.com/Aboutwebturbo.htm, Mar. 10, 1998, 3 pages.
Web Turbo Surf the Web Faster, http://www.webturbo.com/, Mar. 10, 1998, 20 pages.
Web Turbo Surf the Web Faster, http://www.webturbo.com/screenshot.htm, Mar. 10, 1998, 2 pages.

* cited by examiner

Primary Examiner—Crescelle N. dela Torre
(74) Attorney, Agent, or Firm—Bracewell & Patterson, LL (57) ABSTRACT

A method of accessing an electronic page on a computer system, by ascertaining that the electronic page is adapted to be displayed as a single window containing a plurality of frames (having fixed attributes), but then displaying separate windows for respective frames, and enabling one or more window operations for each of the windows, such as resizing, minimizing, maximizing, and closing each of the windows. The windowed frames can be displayed as child windows within a parent window on the display device, or in separate parent windows. The frame windowing mode can be toggled between active and inactive states. Initial attributes of the windows can be based on the frame attributes of the respective frames. These attributes can be ascertained by interpreting tags in a main computer file associated with the electronic page, e.g., an HTML file which is downloaded over the World Wide Web.

20 Claims, 8 Drawing Sheets

DISPLAY MECHANISM FOR HTML FRAMES

BACKGROUND OF THE INVENTION

1. Field of the Invention

The present invention generally relates to computer systems, and more particularly to a method and system for viewing or examining electronic documents, including those transmitted across a computer network. The present invention is adapted for use with the Internet's World Wide Web, but it is generally applicable to any system which provides related computer files wherein it is desirable to view the files concurrently.

2. Description of Related Art

Figure 1:
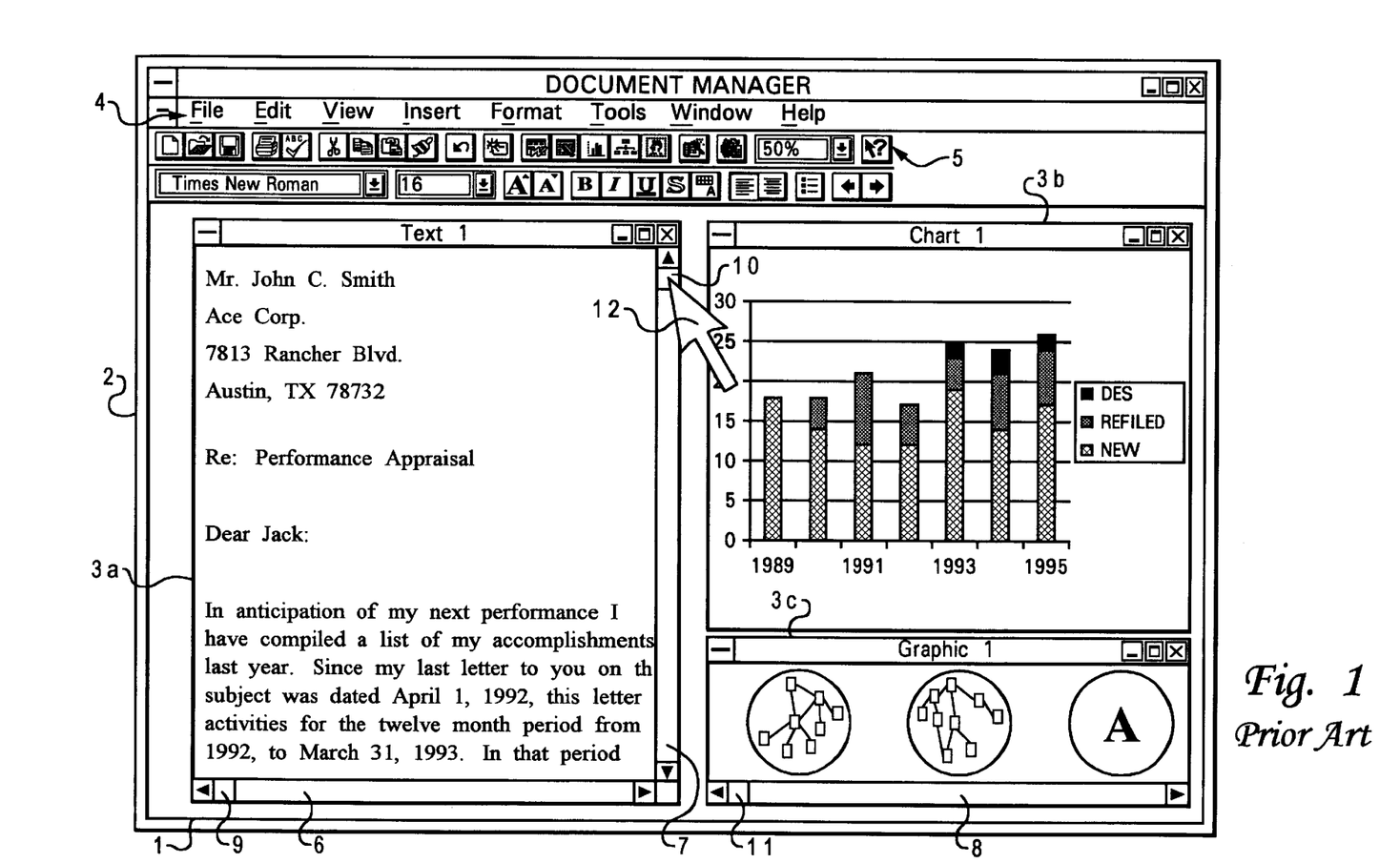
FIG. 1 is an elevational view of a computer display showing a conventional graphical user interface providing a parent window with several child windows, each of which employs scroll bars to pan a document within the respective window.

As illustrated FIG. 1, conventional computers often employ a graphical user interface (GUI) to present information to the user. The GUI is provided by software that is loaded on the computer, specifically, the computer's operating system acting in conjunction with application programs. Two well-known GUIs include OS/2 (a trademark of International Business Machines Corp.) and Windows 95 (a trademark of Microsoft Corp.). In the example of FIG. 1, a primary application window (a "parent" window) 1 is presented on a display device (i.e., video monitor) 2, the application window including several secondary windows ("child" windows) 3a, 3b and 3c which are enclosed by parent window 1. These "sibling" windows 3a, 3b and 3c depict the contents of various files or documents. A standard set of menu commands 4 and a toolbar 5 may be provided as part of the GUI, to simplify manipulation and control of the objects (text, charts and graphics) within the child windows. While FIG. 1 illustrates the sibling windows arranged side-by-side, they can also overlap one another, in multiple layers.

A given file may be too large to be represented within the physical confines of a child (or parent) window, and so scroll bars may be used to move (i.e., pan) the file within the confines of the window's boundaries. A horizontal scroll bar 6 and a vertical scroll bar 7 are shown associated with document window 3a. Graphic window 3b is depicted only with a horizontal scroll bar 8, while chart window 3c is shown without any scroll bars; in other words, the depicted chart file is of a small enough size or scale to be shown completely within the confines of window 3c without the need for any scroll bars. Scroll bars can be dynamically created when a previously small document gets so big that it more than fills the window (such as when a user is writing a letter).

Scroll buttons, such as those indicated at 9, 10 and 11, are often used to indicate the relative placement of a document within the confines of the particular document window. For example, a document whose upper left hand corner is displayed within a document might have a scroll button at the leftmost portion of its horizontal scroll bar, and a scroll button at the uppermost portion of its vertical scroll bar (as show with respect to window 3a in FIG. 1). The scroll bars are manipulated by the use of a visual pointer 12 displayed on the video monitor, which is controlled by a hardware pointing device, such as a "mouse." In FIG. 1, visual pointer 12 takes the form of an arrowhead. Users generally interact with scroll bars according to one of three methods: by clicking on one of the arrow (triangle) icons at either end of the scroll bar (that is, the left and right arrows of a horizontal scroll bar, or the up and down arrows of a vertical scroll bar); by clicking in the area between an arrow icon and a scroll button; or by dragging a scroll button (sometimes referred to as an "elevator") towards one of its associated arrow icons.

Besides scrolling, there are other GUI operations which might be applied to windows. Two common window operations are known as minimizing and maximizing. Generally, a window may be in one of three forms—"minimized," "maximized," or "restored." A parent window is maximized when it fully occupies the display area available to the application (usually the full screen on video monitor 28, less any area that is reserved for interfacing with the operating system). A child window is maximized when it fully occupies the display area available in its parent window. When a window is minimized, it "disappears," or is reduced to a small icon representation or title bar, so that it no longer is presented to receive user inputs. In the case of a minimized parent window, the application is not actually terminated, but is running in the background. Similarly, in the case of a minimized child window, the document is not actually closed, but is simply set aside. A window is in the restored form when its size is somewhere between the minimized and maximized form. In FIG. 1, parent window 1 is maximized, and child windows 3a, 3b and 3c are restored. These latter three windows can be maximized or minimized using buttons provided in the upper right-hand corner of each window, respectively. Similar window control buttons are provided for parent window 1.

Windows (parent or children) can be moved within the available display area if they are in a restored state, typically by placing graphical pointer 12 on the window's title bar and then "dragging" the title bar to another location. Windows can also usually be resized, typically by graphical pointer 12 on one of the corners of the window and then dragging the corner to another location.

Figure 2:
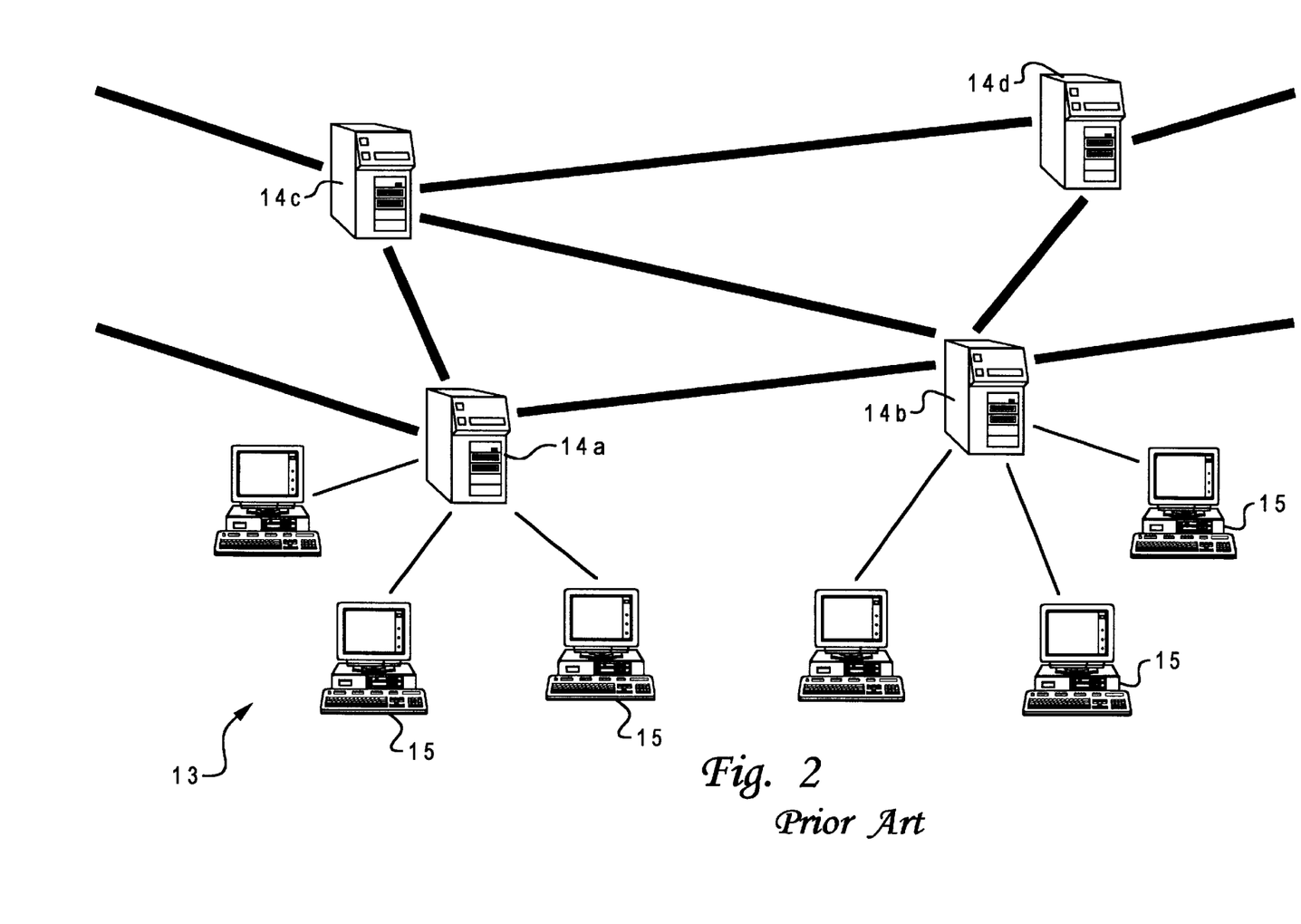
FIG. 2 is a pictorial representation of a conventional computer network, including interconnected servers and client workstations.

The electronic documents depicted in child windows 3a, 3b and 3c may reside locally on a storage device which is physically integrated into the computer, or they may be provided via transmission across a computer network. A generalized client-server computing network 13 is illustrated in FIG. 2. Network 13 has several nodes or servers 14a, 14b, 14c and 14d which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at another set of nodes, or computer workstations (clients) 15. A client is a member of a class or group of computers or computer systems that uses the services of another class or group to which it is not related. Clients 15 can be stand-alone computer systems (like personal computers, or PCs), or "dumber" systems adapted for limited use with network 13 (like network computers, or NCs). A single, physical computer can act as both a server and a client, although this implementation occurs infrequently. A network can be local in nature, or can be further connected to other systems (not shown) as indicated with servers 14c and 14d.

The construction of network 13 is also generally applicable to the Internet. Conventional protocols and services have been established for the Internet which allow the transfer of various types of information, including electronic mail, simple file transfers via FTP (file transfer protocol), remote computing via Telnet, "gopher" searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the target pathname. The URL specifies a hypertext transfer protocol ("http") and a pathname of the server. The server name is associated with a unique numeric value (a TCP/IP address, or "domain").

World Wide Web files (or "pages") are interrelated by providing hypertext links in each of the files; closely interrelated pages are commonly referred to as a "web site". A hypertext link is an image which is viewable on the workstation's display and can be selected by the user using the mouse (or via a keyboard command), and which then automatically instructs the client workstation 15 to request another page associated with the selected hypertext link (i.e., issue another URL). A hypertext link may appear as a picture, or as a word or sentence, possibly underlined or otherwise accentuated to indicate that it is a link and not just normal, informative text or graphics.

A WWW page may have text, graphic (still) images, and even multimedia objects such as sound recordings or animated video clips. A hypertext page, if more than just text, is usually constructed by loading several separate files, e.g., the hypertext file "main.html" might include a reference to a graphic image file "picture.gif" or to a sound file "beep.wav". When a client workstation 15 sends a request to a server for a page, the server first transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor. A page may be "larger" than the physical size of the monitor screen (i.e., larger than the software-programmed window provided for viewing the page), and techniques such as scroll bars are used by the viewing software (the web browser) to view different portions of the page.

Web pages are created using field-based languages such as the hypertext markup language (HTML). This language provides a protocol for transmitting formatted information and control codes used to construct the "complete" page that is ultimately displayed by the browser. Different fields within the main HTML file are defined to store the formatted information and control code parameters, using tags. Tags not only mark elements, such as text and graphics, but can also be used to construct graphical user interfaces within the web page (such as control buttons that are "depressed" by selecting them using the graphical pointer). In HTML, a tag is a pair of angle brackets (<>) that contain one or more letters and numbers between the angle brackets. One pair of angle brackets is often placed before an element, and another pair placed after, to indicate where the element begins and ends. For example, the language "<B>TODAY ONLY</B>" uses the "B" tag to provide a boldface formatting code for the words "TODAY ONLY."

Figure 3:
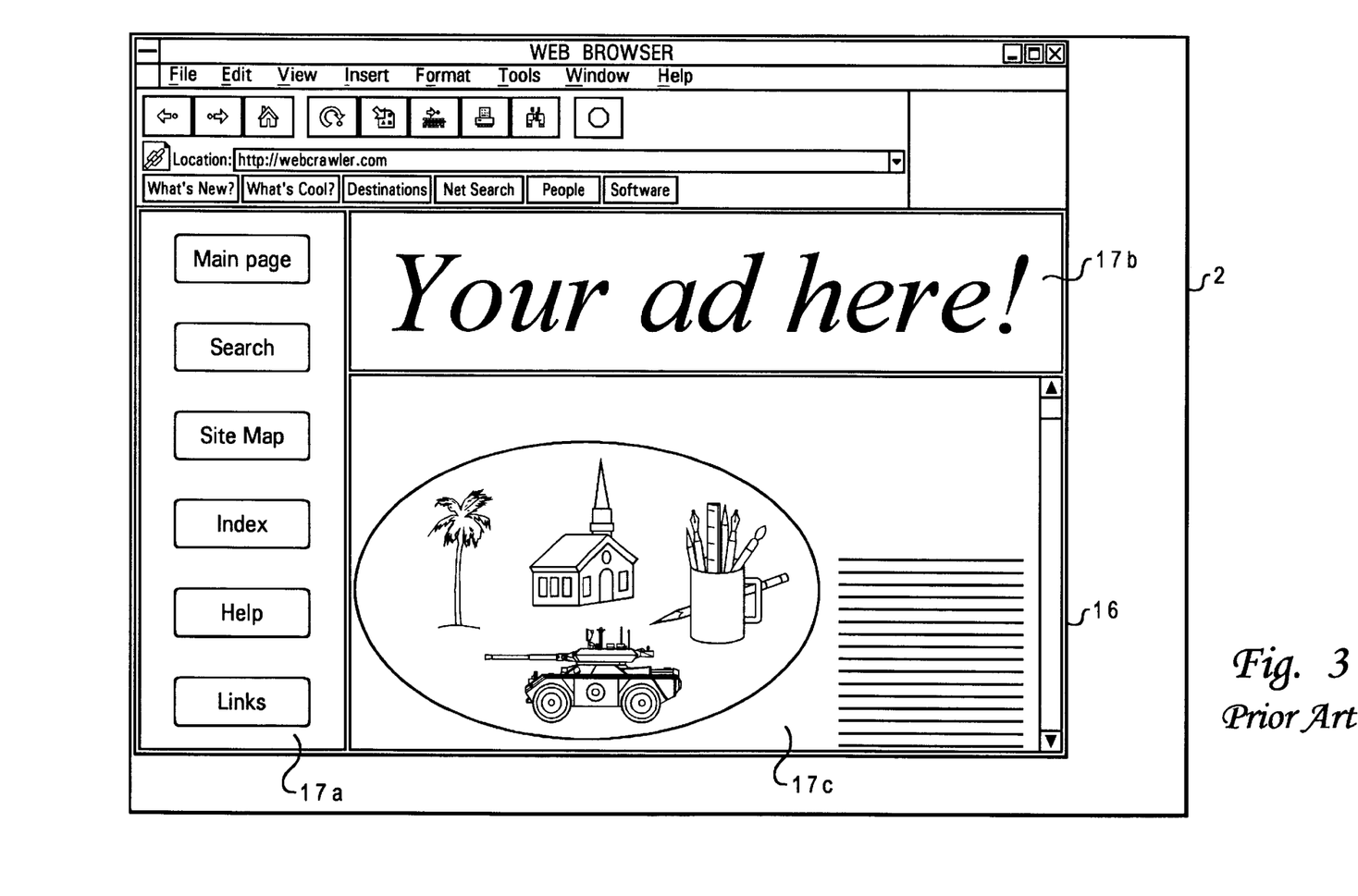
FIG. 3 is an elevational view of a computer display showing a conventional web browser which presents multiple files in different frames of a single web page.

One innovation in web browsers allows the simultaneous display of multiple fields or "frames" within a single window, as illustrated in FIG. 3. Browser window 16 on computer display 2 contains three frames 17a, 17b and 17c which divide the web page into multiple scrollable regions. Frames can be created via HTML using the "FRAMESET" tag which specifies exactly how the frames will appear on the web page, and the "FRAME" tag which defines the various aspects of each frame, including which particular URL to load in the frame. The "COLS" and "ROWS" attributes placed within the FRAMESET tag dictate how the page is to be arranged. For example, the tag <FRAMESET COLS="50%, 50%"> divides the browser window vertically into two equal halves (one frame on the left, and one frame on the right).

Frames are not child windows; that is, they are not resizable or otherwise controllable, since their attributes are fixed by the HTML coding. This aspect of frames can be very frustrating, because certain frames often take up so much of the web browser display area that other important frames are difficult to examine. In the example of FIG. 3, the web page has been constructed to provide one frame (17a) with a few control buttons or hypertext links to other pages at the web site, another frame (17b) having an advertisement, and the third frame (17c) containing the information which is of actual interest to the user. As a result, the viewable area assigned to frame 17c is considerably small, making the contents more difficult to read. This smaller presentation area can also make it more difficult to scroll through the frame using the scroll button. These difficulties are exacerbated when the parent browser window uses less than the full display area (i.e., the browser is in a restored state). Additionally, the advertisement in frame 17b might be presented with automated blinking, scrolling or highlighting which is very distracting, and can be particularly aggravating since that frame cannot be removed or reduced in size. Moreover, the web site may be designed such that the unwanted advertisement frame 17b persists even when other files are loaded into the other frames.

Older web browsers do not support frames, so some web sites give the user an option of downloading two pages that are generally similar except that one page uses frames and the other does not (two different hypertext links are provided to the alternate pages). This option allows the user to avoid the aforementioned problems with frames, but not all web sites provide this option. Furthermore, this approach results in the user losing any advantages of frames which may be desirable to some extent. In FIG. 3, for example, the user may want to keep the set of links in frame 17a available while loading other pages in frame 17c.

In light of the foregoing, it would be desirable to devise an improved web browser providing an alternative mechanism for handling page frames, to allow the user to exert more control over each frame. It would be further advantageous if the method could retain the current behavior and user interaction for windows, and extend the functionality without unduly increasing the visual complexity.

SUMMARY OF THE INVENTION

It is therefore one object of the present invention to provide an improved method for viewing electronic documents using a computer.

It is another object of the present invention to provide such a method which is adapted for viewing documents delivered across a network, such as hypertext documents delivered via the World Wide Web.

It is yet another object of the present invention to provide such a method that bestows user (client) control of HTML frames.

The foregoing objects are achieved in a method of accessing an electronic page on a computer system, generally comprising the steps of ascertaining that the electronic page is adapted to be displayed as a single window containing a plurality of frames (having fixed attributes), displaying a plurality of windows on a display device of the computer system, wherein each window corresponds to a respective one of the frames, and enabling one or more window operations for each of the windows, such as the operations of individually resizing, minimizing, maximizing, and closing each of the windows. The windowed frames can be displayed as child windows within a parent window on the display device, or in separate parent windows. The frame windowing mode can be toggled between active and inactive states. Initial attributes of the windows can be based on the frame attributes of the respective frames. These attributes can be ascertained by interpreting tags in a main computer file associated with the electronic page.

The present invention is particularly useful when implemented in a web browser which retrieves framed electronic pages via the Internet using, e.g., HTML files. With the present invention, users can more effectively manipulate and manage the viewable area of the browser while preserving the advantages of frames.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 4:
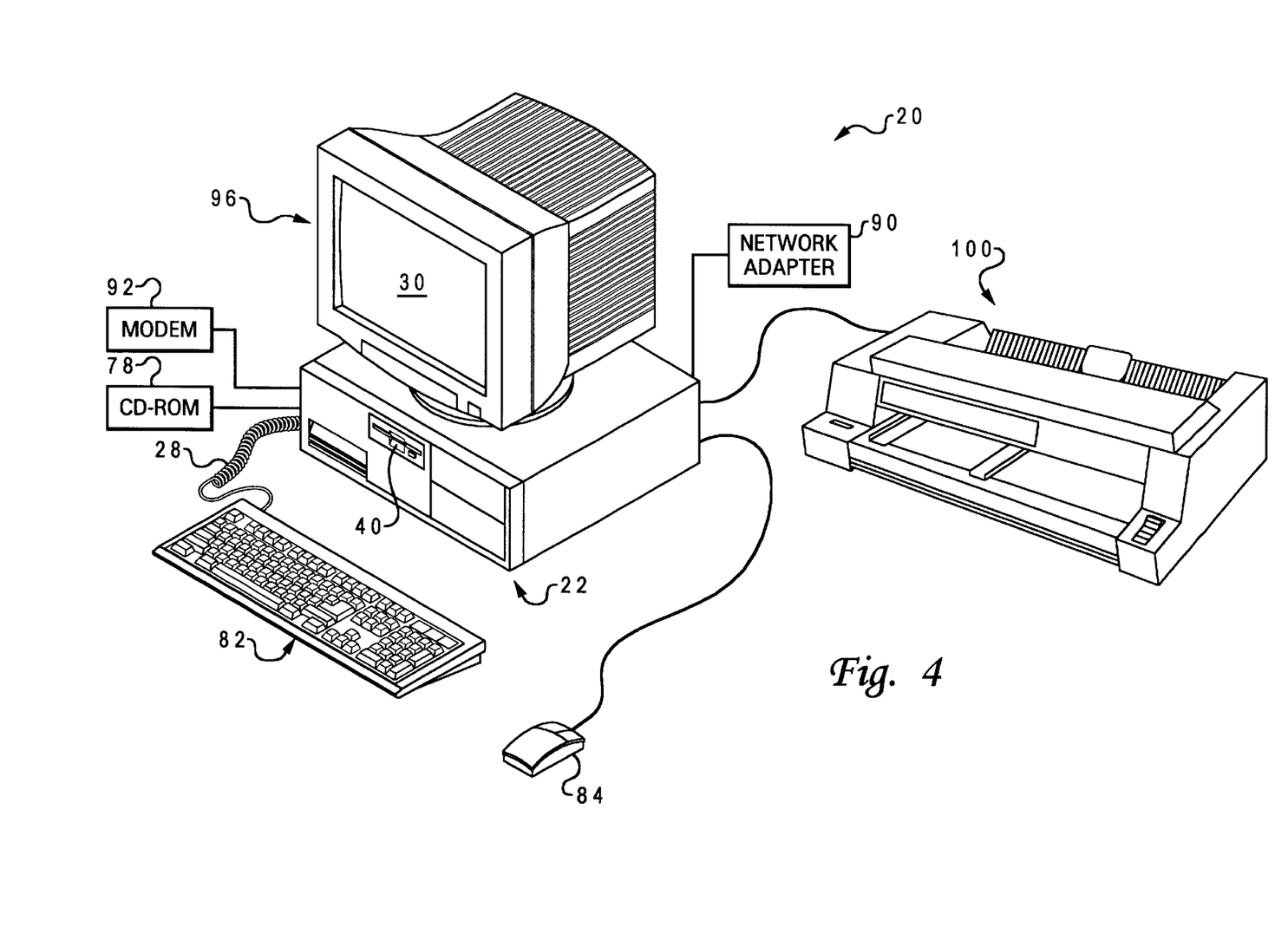
FIG. 4 is a perspective view of one embodiment of a data processing system in which the present invention can be practiced.

With reference now to FIG. 4, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 5:
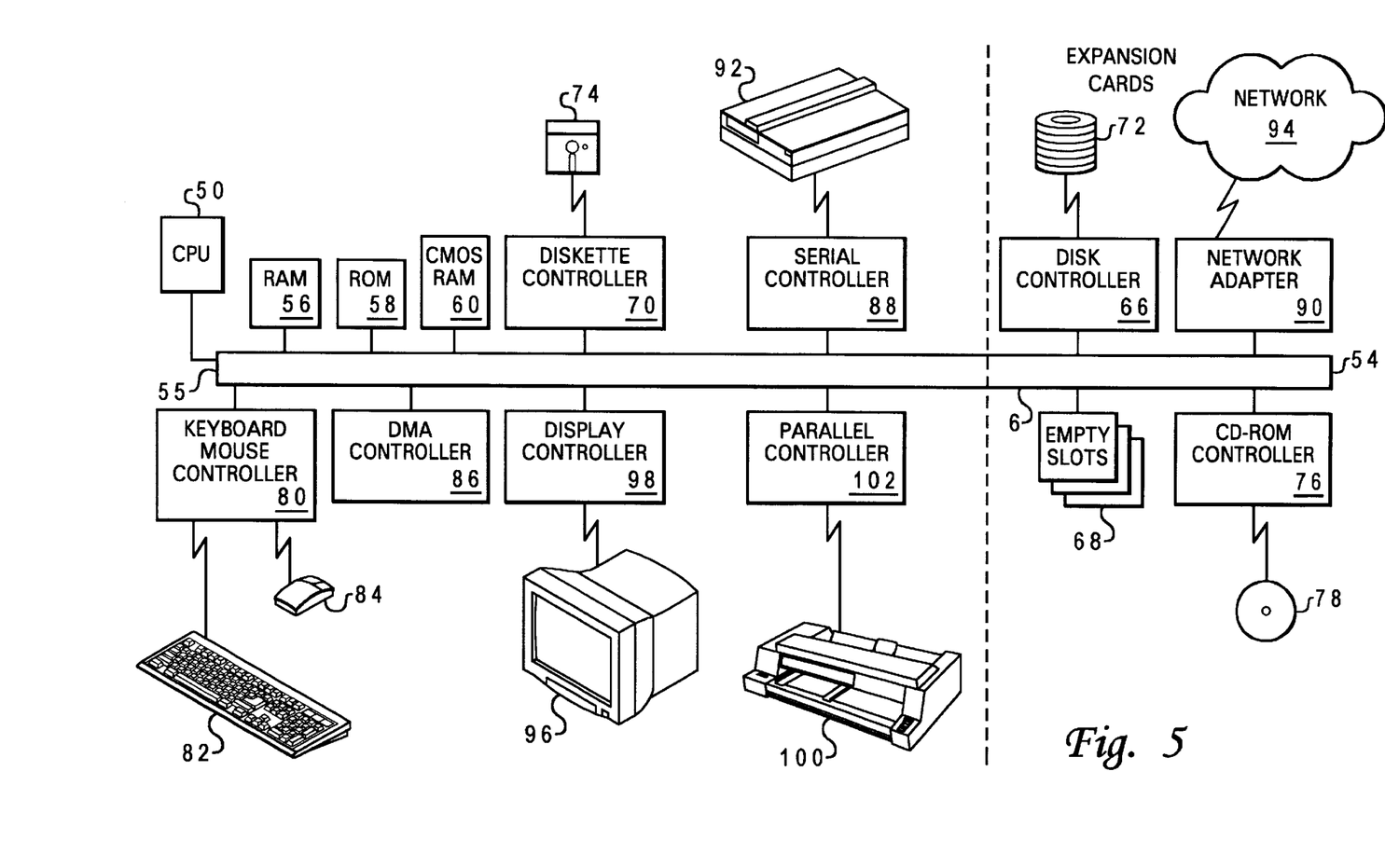
FIG. 5 is a high-level block diagram illustrating selected components that can be included in the data processing system of FIG. 4 according to the teachings of the present invention.

Referring to FIG. 5, a high level block diagram is shown illustrating selected components that can be included in the data processing system 20 of FIG. 4 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 55 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 5, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM—assignee of the present invention).

Communication between processing system 20 and other data processing systems may be facilitated by serial controller 88 and network adapter 90, both of which are coupled to system bus 55. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software and data, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with, e.g., a CRT-based video display, an LCD-based flat-panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 55 and another parallel communication device, such as a printer 100.

CPU 50 fetches, decodes, and executes instructions, and transfers information to and from other resources via the computers main data-transfer path, system bus 55. Such a bus connects the components in a data processing system 20 and defines the medium for data exchange. System bus 55 connects together and allows for the exchange of data between memory units 56, 58, and 60, CPU 50, and other devices as shown in FIG. 5. Those skilled in the art will appreciate that a data processing system constructed in accordance with the present invention may have multiple components selected from the foregoing, including even multiple processors.

Figure 6:
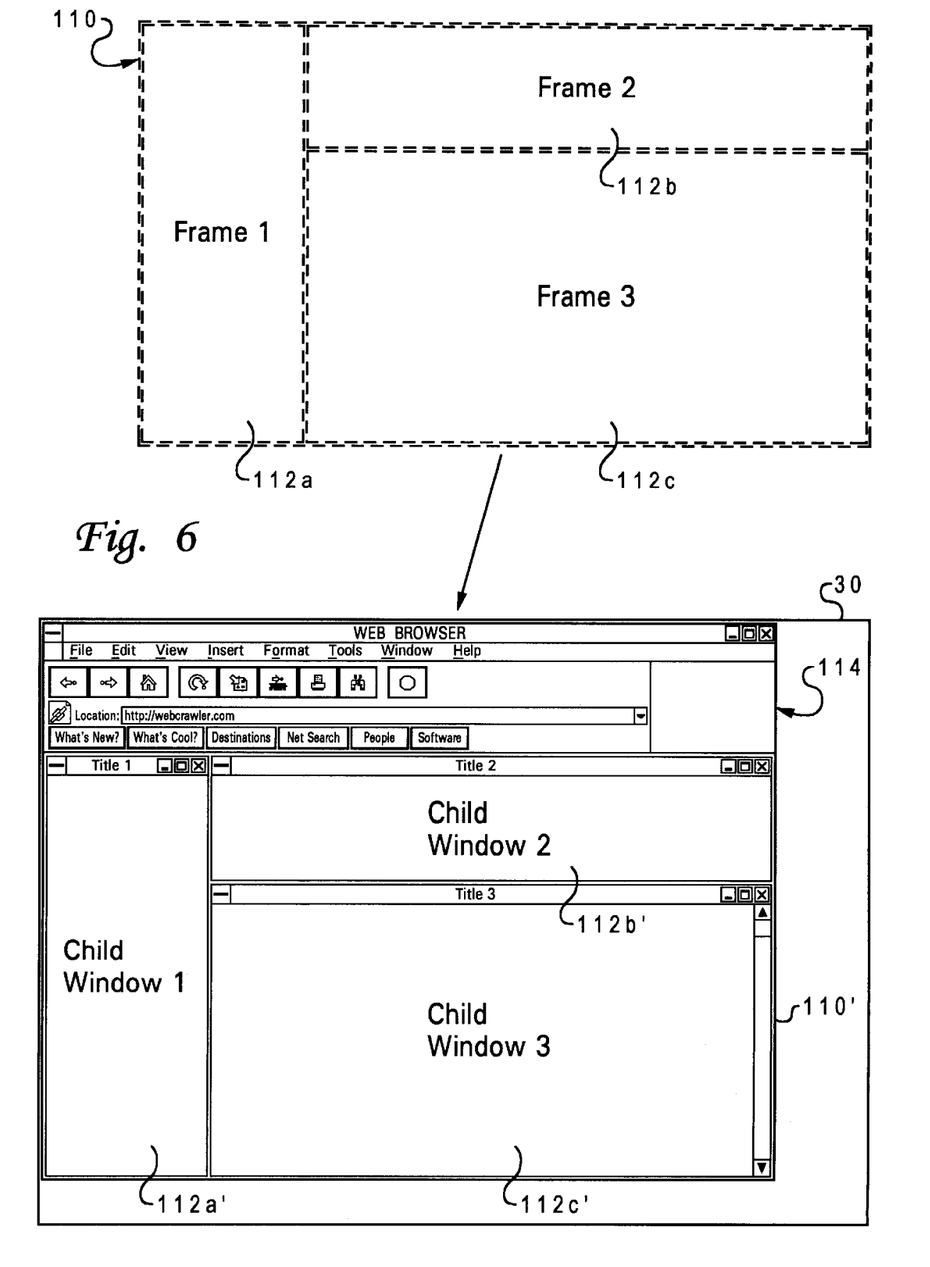
FIG. 6 is a pictorial representation of the creation of multiple child windows in a web browser wherein each child window corresponds to a respective frame defined by a web page, according to one implementation of the present invention.

With further reference to FIG. 6, one implementation of the present invention allows data processing system 20 to act as a client and display a web page, designed to have frames, using a novel viewing mechanism. Browser software constructed in accordance with the present invention displays a main browser window 114 on monitor 30. The browser software may be stored on hard disk drive 72, such that it can be loaded into RAM 56 and executed by CPU 50.

In this example, a web page 110 resides at a remote server (not shown) in the form of a main HTML file which uses appropriate tags to create three frames 112a, 112b and 112c. The page as it is intended to be displayed by the page creator (with three frames) is shown at the top of FIG. 6 in dashed lines. When the browser software retrieves page 110, it ascertains that the page is intended to be displayed with frames by interpreting the HTML tags, but it instead presents each frame as a separate window with its own controls to enable one or more window operations that otherwise would not be available to the frames. The displayed page 110' thus has three child windows 112a', 112b' and 112c' corresponding to the three frames 112a, 112b and 112c, respectively.

For the depicted implementation, the initial attributes of the windows are set by the frame attributes. In other words, the sizes and locations of windows 112a', 112b' and 112c' within the viewable area of browser window 114 are based on the values provided in the FRAMESET tag of the main HTML file. Conversion of a frame to a window in this manner may result in slight presentation differences, such as the depiction of a vertical scroll bar for child window 112c'. In this example, a scroll bar was not necessary for the hypothetical presentation of the content of the frame as depicted at 112c, but window 112c' has a slightly smaller vertical dimension due to the addition of a title bar (which also bears one or more window control buttons), so the vertical scroll bar is added by the browser software to allow full, scrollable viewing of the frame content. The present invention does not, however, require inclusion of a title bar for each child window.

In an alternative implementation, the initial attributes of the windows are set by the user. For example, the user may want all frames to initially appear as minimized windows, or as cascaded windows. The browser software can provide an options menu or dialog box (not shown) for selecting such initial window attributes.

Figure 7:
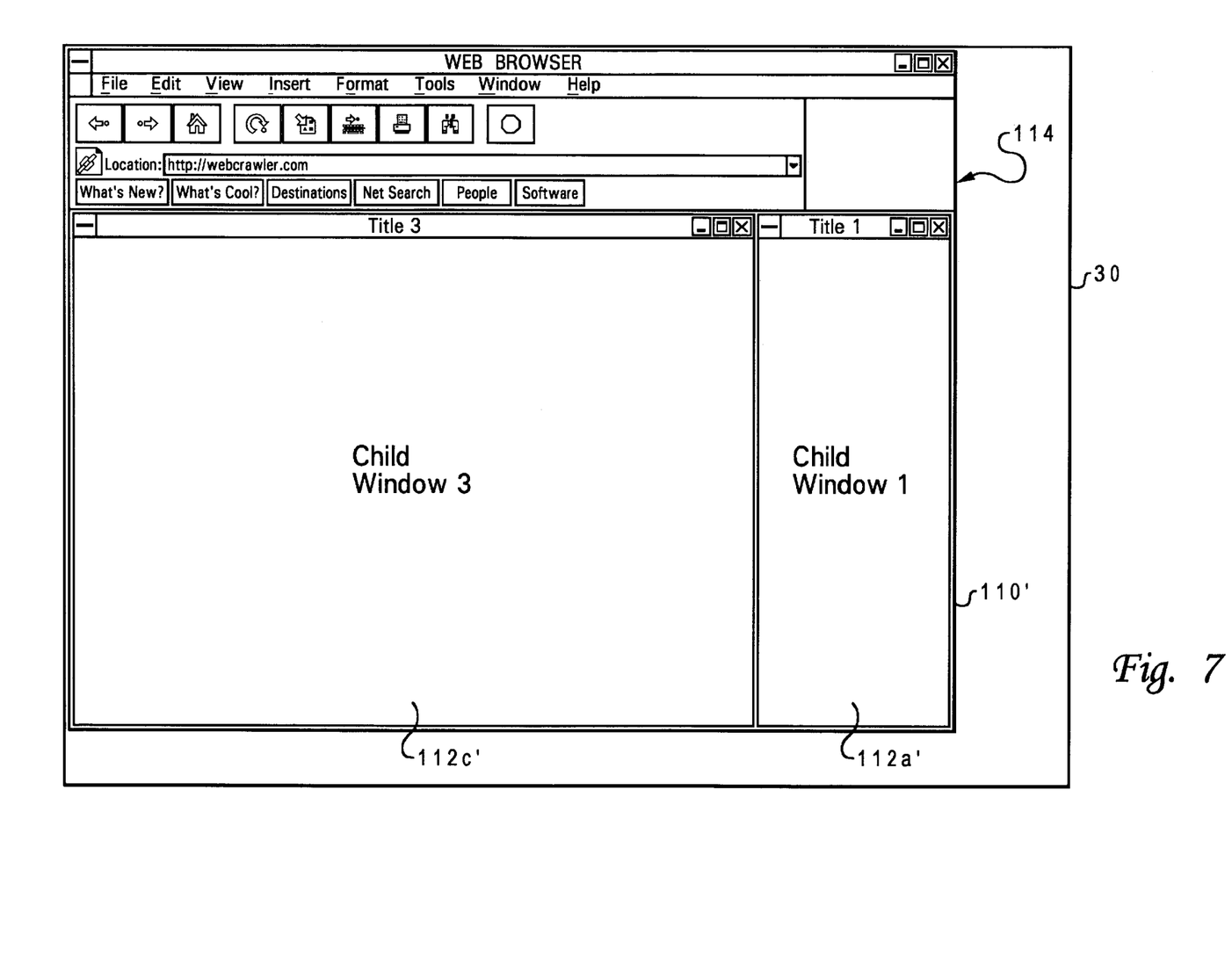
FIG. 7 is an elevational view of the computer display of FIG. 6, depicting user manipulation of the child windows.

In the illustrative embodiment, these "windowed" frames 112a', 112b' and 112c' can be tiled, cascaded or otherwise overlapped within the browser work space, and can also be individually resized, minimized, maximized, or even closed altogether, giving the user complete control over each frame. This capability is shown in FIG. 7, wherein child window 112a' has been moved from the left side of browser window 114 to the right side, window 112b' has been closed, and window 112c, has been enlarged (and moved to the left). When a window such as 112b' is closed, future data specified for the associated frame need not be downloaded, i.e., any URLs designated for that frame need not be requested by the browser software and so are filtered out. This feature is particularly useful where a frame is created solely for advertising or a similar purpose which is deemed unnecessary or unwanted by the user. By skipping such unwanted content, the desired content in the other windowed frames can be downloaded and processed (displayed) more quickly.

Figure 8:
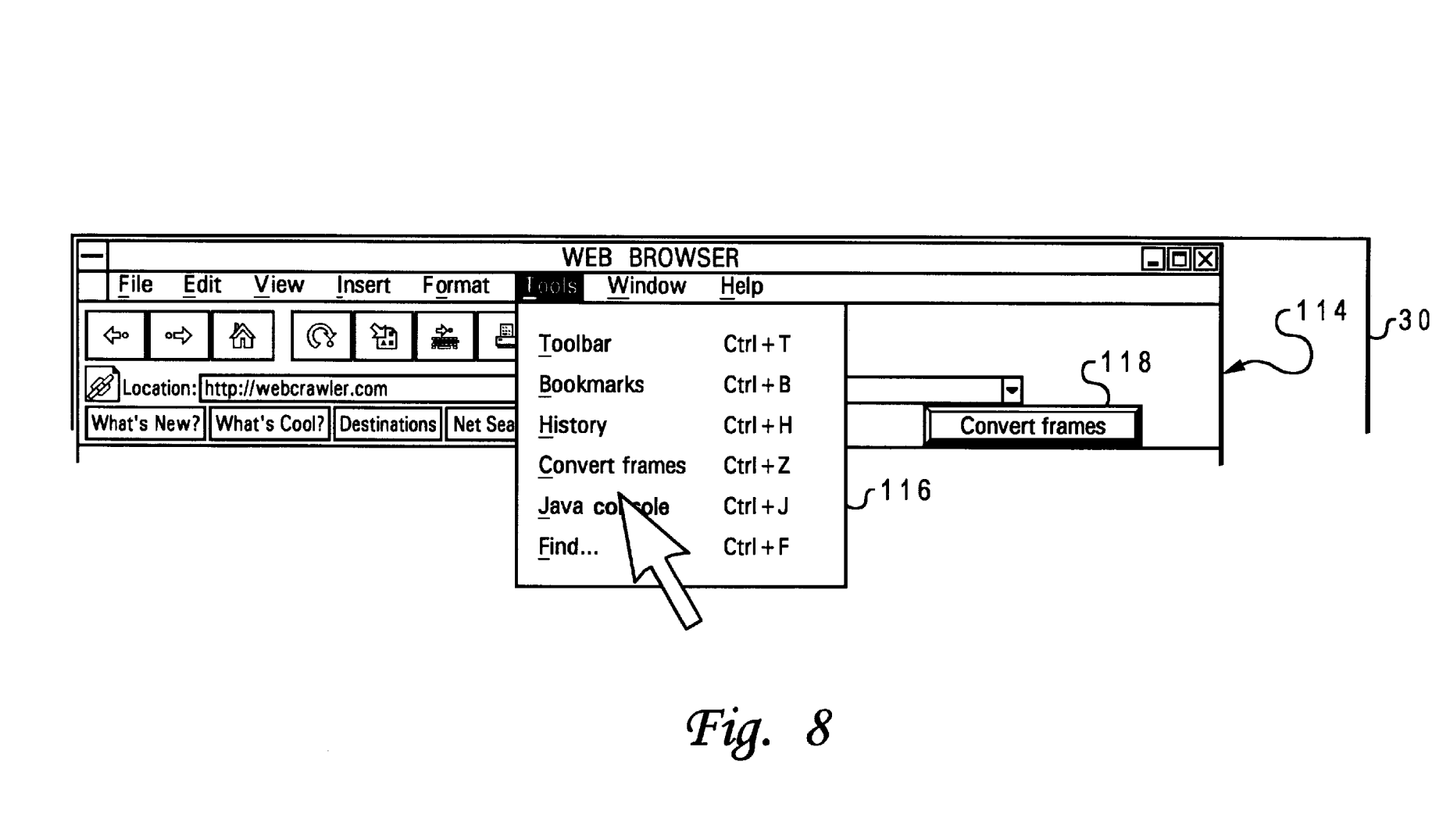
FIG. 8 is a partial elevational view of the computer display of FIGS. 6 and 7, depicting various ways that the frame control technique of the present invention may be toggled between active and inactive states.

The present invention may be selectively implemented by the user, with a browser command that activates or deactivates (toggles) frame windowing. Any sort of command can be used to toggle the mode on and off. FIG. 8 illustrates the use of a pull-down menu 116 which includes several menu items, among them a "Convert frames" option that, when selected, activates the frame windowing mode. As shown in pull-down menu 116, a keyboard command (keystroke combination) can also be used to toggle the frame windowing mode. FIG. 8 further illustrates a control button 118 provided in the graphical user interface of the browser software (that is, in a toolbar of the browser), which can be used to toggle this mode. The browser can be designed to effectuate frame-to-window conversion for a page that is already loaded with normal frames in the browser when the mode is activated, i.e., re-display the same page in the new windowed format. This retroactive application of the frame windowing mode can also apply to cached pages which are displayed using the browsers "Back" feature (or using a history table to similarly return to a previously loaded page).

Various other enhancements can be enabled when frame windowing is active. For example, the browser can be configured to download the content of any minimized windows only after substantially loading the content of any displayed (maximized or restored) windows, in order to speed up the display of those frames which are of interest to the user. Similarly, if several overlapping windows are displayed, then the browser might substantially load the content of the topmost (higher priority) window before loading the content of any other windows. Such features can be automatically carried out by the browser, or may be optionally selected by the user via another menu or dialog box provided by the browser (not shown).

While the figures illustrate conversion of frames for a single page into multiple child windows of a single parent browser window, those skilled in the art will appreciate that the invention can alternatively be implemented to generate separate parent browsers for each frame, where the windowed frame fully occupies the viewable area in any given browser (although the latter implementation is likely to increase the demands on operating system resources). In either case, the implementing software may designate a maximum number of windows that can be created by the frame windowing technique. This maximum value may be permanently set to a predefined value within the software, or could vary according to user input. The implementing software can determine the number of windows that would be required prior to actually creating any windows (by simply analyzing the FRAMESET tag attributes) and, if the maximum value would be exceeded, inform the user and abort the process using an error-handling routine.

Users have heretofore complained that framed web pages take up too much of a web browser display area, and cannot be adequately manipulated. The present invention eliminates these concerns by providing effective mechanisms for controlling and managing the viewable area of a browser, or other viewing software. Furthermore, it preserves the advantages of frames (concurrent viewing of separate documents), and retains the current behavior and user interaction for windows. These advantages are conferred without unduly increasing the visual complexity of the browser.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention may be implemented in other networks besides the Internet; indeed, the present invention is not even limited to network operation, i.e., it can allow the creation of separate windows corresponding to page frames that are defined in a local HTML file (residing on hard disk drive 72). Also, the invention is not limited to HTML—a browser constructed in accordance with the present invention could provide the novel viewing mechanism for pages designed in other languages, such as extensible markup language (XML). It is therefore contemplated that such modifications can be made without departing from the spirit or scope of the present invention as defined in the appended claims.

What is claimed is:

1. A method of accessing an electronic page on a computer system, comprising the steps of:

toggling a frame windowing mode of the computer system into an active state;

receiving, subsequent to said toggling step, an electronic page including two or more frames having fixed attributes;

in response to said receiving step, automatically displaying said electronic page with each frame represented as an independent window on a display device of the computer system; and enabling one or more window operations for each of the independent windows.

2. The method of claim 1 wherein the page is constructed from at least one file located on a network of the computer system, and further comprising the step of downloading the file to the computer system.

3. The method of claim 1 further comprising the step of determining that the number of frames in the electronic page does not exceed a maximum number.

4. The method of claim 1 wherein said displaying step displays the independent windows as child windows within a parent window on the display device.

5. The method of claim 1 wherein the one or more window operations include the operations of individually resizing, minimizing, maximizing, and closing each of the windows.

6. The method of claim 1 wherein said displaying step comprises setting initial attributes of the windows based on frame attributes of the frames.

7. The method of claim 1 further comprising the step of interpreting tags in a file associated with the electronic page to ascertain that said electronic page contains frames which are to be displayed as independent windows.

8. The method of claim 7, wherein said electronic page is a web page created by said file and includes a beginning tag, an end tag and frame specific tags that indicate when a frame generated by said file is to be represented as an independent window.

9. A computer system comprising:

a processor;

a device;

a display device; and program means on said device for accessing an electronic page by (i) receiving an electronic page constructed from files distributed across a network of the computer system, wherein said electronic page includes two or more frames having fixed attributes, (ii) ascertaining that the electronic page is adapted to be displayed as a single window containing a plurality of frames by interpreting tags in a file associated with the electronic page, (iii) automatically displaying said electronic page with each frame represented as an independent window on said display device, and (iv) enabling one or more window operations for each of the independent windows.

10. The computer system of claim 9 wherein said program means further displays the windows as child windows within a parent window on said display device.

11. The computer system of claim 9 wherein said program means further determines that the number of frames in the electronic page does not exceed a maximum number.

12. The computer system of claim 9, wherein said program means includes means for toggling a frame windowing mode of the computer system between active and inactive states prior to a receipt of said electronic page.

13. The computer system of claim 9 wherein the one or more window operations include the operations of individually resizing, minimizing, maximizing, and closing each of the windows.

14. The computer system of claim 9 wherein said program means displays the windows using initial window attributes based on frame attributes of the frames.

15. A computer program product comprising:

a storage medium adapted to be read by a computer; and program means stored on said storage medium for accessing an electronic page by (i) receiving an electronic page including two or more frames having fixed attributes, (ii) ascertaining that the electronic page is adapted to be displayed as a single window containing a plurality of frames by interpreting tags in a file associated with the electronic page, (iii) automatically displaying said electronic page as a plurality of windows on a display device of the computer, wherein each independent window corresponds to a respective one of the frames, and (iv) enabling one or more window operations for each of the independent windows.

16. The computer program product of claim 15 wherein said program means further displays the windows as child windows within a parent window on the display device.

17. The computer program product of claim 15 wherein said program means further determines that the number of frames in the electronic page does not exceed a maximum number.

18. The computer program product of claim 15, wherein said program means includes means for toggling a frame windowing mode between active and inactive states prior to a receipt of said electronic page.

19. The computer program product of claim 15 wherein the one or more window operations include the operations of individually resizing, minimizing, maximizing, and closing each of the windows.

20. The computer program product of claim 15 wherein said program means displays the windows using initial window attributes based on frame attributes of the frames.

* * * * *